United States Patent [19]

Winzer

[11] 4,378,143

[45] Mar. 29, 1983

[54] DEVICE FOR COUPLING RADIATION INTO AN OPTICAL WAVEGUIDE

[75] Inventor: Gerhard Winzer, Munich, Fed. Rep. of Germany

[73] Assignee: Siemens Aktiengesellschaft, Berlin & Munich, Fed. Rep. of Germany

[21] Appl. No.: 184,004

[22] Filed: Sep. 4, 1980

[30] Foreign Application Priority Data

Sep. 25, 1979 [DE] Fed. Rep. of Germany ....... 2938810

[51] Int. Cl.³ .................... G02B 5/14; G02B 5/172
[52] U.S. Cl. .................... 350/96.15; 350/96.16; 350/96.18
[58] Field of Search ............... 350/96.15, 96.16, 96.18, 350/96.29, 96.33

[56] References Cited

U.S. PATENT DOCUMENTS

| | | | |
|---|---|---|---|
| 3,937,560 | 2/1976 | Milton | 350/96.16 |
| 4,057,719 | 11/1977 | Lewis | 350/96.15 X |
| 4,173,390 | 11/1979 | Käch | 350/96.18 X |
| 4,176,908 | 12/1979 | Wagner | 350/96.15 |

OTHER PUBLICATIONS

H. F. Mahlein, "Design of Beam Splitters for Optical Fiber Tapping Elements," *Siemens Forsch.—u. Entwickl.—Ber.*, vol. 8, No. 3, (1979).

*Primary Examiner*—Marvin L. Nussbaum
*Attorney, Agent, or Firm*—Hill, Van Santen, Steadman, Chiara & Simpson

[57] ABSTRACT

An optical device coupling light between a first light waveguide and either a second light waveguide or a radiation source characterized by the first light waveguide having a core of a predetermined cross-sectional area, a reflective layer or mirror of a high reflectance being disposed on an angle to the axis of the waveguide and occupying only a small portion of the total cross-sectional area of the core so that only a small portion of the light traveling in the core of the first waveguide will be blocked by the presence of the mirror. The second waveguide will have a core diameter substantially smaller than that of the first waveguide and the mirror is mounted in the first core adjacent to the connection with the second core. The radiation source may be either a laser diode, semi-conductor laser or a light emitting diode.

11 Claims, 5 Drawing Figures

DEVICE FOR COUPLING RADIATION INTO AN OPTICAL WAVEGUIDE

BACKGROUND OF THE INVENTION

The present invention is directed to a device for coupling radiation between a first light waveguide and either a second light waveguide or a radiation conducting core area of a radiation source.

SUMMARY OF THE INVENTION

The present invention is directed to providing an optical device which will weaken the radiation conducted in the first waveguide to only a slight degree and yet enables a high input coupling efficiency of light of a second waveguide or from a radiation source into the first waveguide. The object is accomplished by an optical device for coupling light between a first light waveguide and a member having a light transmitting zone such as a second waveguide or a radiation source, said device comprising said waveguide having a core of a predetermined cross-sectional area, a reflective layer of a high reflectance being disposed on an angle to the axis of the waveguide and occupying only a small portion of the total cross-sectional area of the core and means for arranging said member with the light transmitting zone being aligned with the reflective layer.

The present invention provides a low weakening of the radiation being conducted in the first or main waveguide because the reflective layer or mirror only occupies a slight part of the core area of the waveguide. If for example the reflective layer occupies only 10% of the cross-sectional surface of the core area, then the radiation conducted will only be weakened by about 10%.

A high input efficiency is achieved due to the high reflectance of the reflective layer or mirror. By increasing this reflectance, the input efficiency can be made greater. In any case, the reflectance should be greater than 50%. A high reflectance is possible because the attenuation of the guided radiation due to the insertion of the mirror or the reflective layer can only remain as subordinate significance and is therefore insignificant.

For a good input efficiency, it is also significant that, as much as possible, the radiation to be coupled into the first mentioned waveguide strikes the reflective layer in the core area and that the rays are inclined, insofar as possible, with respect to a marked ray, at the most by an angle which is equal to half the acceptance angle of the optical waveguide. A marked ray is therefore a ray, which is reflected by the reflective layer or mirror in one direction which is parallel to the axis or respectively to the primary propagation direction of the radiation in the optical waveguide.

In practice, one expediently employs a radiation whose divergence or convergence angle at most corresponds to the acceptance angle of the optical waveguide. One allows it to strike that part of the reflective layer situated in the core area in such a manner that the axis of radiation corresponds to the marked beam or ray.

A divergence or convergence angle of radiation pattern can be suitably adjusted by means of lens. The diameter of the radiation pattern can also be adjusted.

An advantageous embodiment of the inventive device is designed in such a manner that the reflective layer acts as a radiation exit window for radiation from the light transmitting zone of the second optical fiber or the radiation source and the radiation which is projected on the reflective layer will emerge into the core of the waveguide. By means of this feature, an optimum adaptation of the reflective layer or mirror to the radiation pattern is provided and is favorable for a high input efficiency with a simultaneously low attenuation of the guided radiation.

Another preferred embodiment of the invention is one in which the waveguide is a waveguide tri-port in which the reflective layer is disposed on a plane extending at 45° to the axis of the first waveguide, the member is a second waveguide having a core with a diameter smaller than the diameter of the core of the first waveguide and the means for arranging mounts the second waveguide on the first waveguide to extend at 45° to the reflective layer with the core forming a radiation window for projecting radiation at the reflective layer for coupling into the first waveguide. Preferably, the second waveguide has a numerical aperture which is about equal to the numerical aperture of the first waveguide.

Another embodiment of the inventive device is a waveguide bi-port in which the member is an active radiation source having a radiation exit window aligned with the reflective layer for coupling radiation directly into the waveguide. Preferably, this device is either a semi-conductor laser or a light emitting or luminescent diode and the radiation source is mounted directly on the waveguide with its axis being at 45° to the reflective layer which is also at 45° to the core axis of the first waveguide.

In any of the above cases, it is expedient to design optical devices with the reflective layer or mirror being arranged on the side of the core area in which the radiation is to be coupled in or out. The optical device is particularly useful in coupling radiation into a thick core fiber.

The optical device in accordance with the present invention is particularly suitable for coupling light from a subscriber terminal station into an optical data line. The inventive device can be expanded into a coupling-in block for bit-parallel data input. The laser diodes, as described above, can be used in this particular device for this application.

The manufacturer of the inventive device is free of problems. All technologies which are used for the manufacturing of the coupling elements according to the beam divider principle are employed.

DESCRIPTION OF THE PREFERRED EMBODIMENTS

Figure 1:
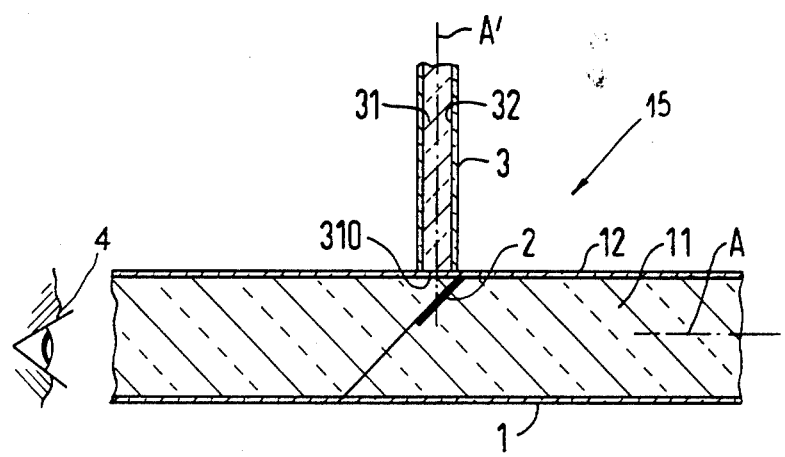
FIG. 1 is a longitudinal cross-sectional view of an optical device which is a tri-port.

The principles of the present invention are particularly useful in an optical device generally indicated at 15 in FIG. 1. The optical device 15 comprises a waveguide 1 having a thick core glass fiber with a stepped index profile. The fiber 1 has a core 11 consisting of a glass of a high index of refraction and a sheath or cladding layer 12 consisting of glass. A reflective layer 2 or mirror is arranged at an angle of 45° to an axis A of the waveguide 1 and as illustrated, it is situated on an upper side of the core 11. In relation to the diameter of the core 11, the sheath or cladding layer 12 of the fiber is thin. The core 11 is the area in which the radiation is primarily guided and the radiation generally being light of a wavelength between a thermal radiation range and a short wave UV range.

A second glass fiber 3, which has a stepped index profile, is mounted on the thick core fiber 1 above the reflective layer 2 in such a manner that its axis A' strikes the reflective layer 2 at an angle of 45°. The glass fiber 3 also has a core 31 and a cladding layer or sheath 32 which surrounds the core. The core 31 and the sheath 32 both consist of glass with the glass of the core 31 exhibiting a higher index of refraction than the glass of the cladding layer 32.

The diameter of the core 31 of the glass fiber is smaller than the diameter of the core 11 of the thick core fiber forming the waveguide 1. An end face 310 of the core 31, which faces the thick core fiber, forms a radiation exit window from which the radiation emerges as a beam core. The radiation exit window, which exhibits a circular cross-section, is projected by this radiation exit window onto the plane of the reflective layer 2 is an ellipse. The reflecting layer 2 is likewise designed as an ellipse and covers this surface of the projected ellipse from the core 31.

Figure 2:
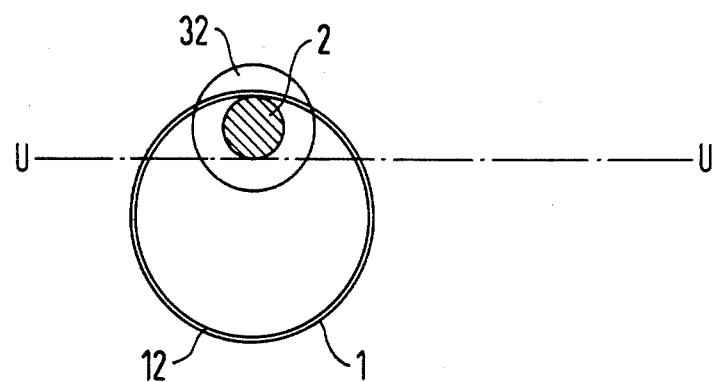
FIG. 2 is an end view of the device as illustrated by looking through the core of the device of FIG. 1.

When the reflective layer 2 is viewed through the thick core fiber 1 such as from an end indicated by the viewer's eye 4 in FIG. 1, it will appear circular as is indicated in FIG. 2 by the shaded area 2. The glass fiber 3 has also been removed from the device illustrated in FIG. 2 which is not in the same scale as the device of FIG. 1.

It is expedient that when a numerical aperture of the thick core fiber 1 is at least as large as the numerical aperture of the glass fiber 3.

The reflective layer 2 could also occupy an entire area above the line U—U of FIG. 2. However, somewhat greater losses would occur because the radiation conducted in the thick core fiber 1 would have a higher attenuation with this construction.

As already mentioned, the reflective layer 2 should exhibit the greatest possible reflectance. Given a dielectric mirroring, a reflectance of nearly 100% can be achieved. A metal mirroring layer can also be utilized for the reflective layer 2.

As an example, the optical device 15 has a thick core fiber 1 whose core diameter is 110 μm and whose overall diameter is 115 μm. The second glass fiber 3 has a core diameter of 40 μm and an overall diameter of 80 μm. The numerical aperture of the thick core fiber 1 will be 0.4 and the glass fiber 3 will have a numerical aperture of between 0.2 and 0.4. In this example, the radiation conducted in the thick core fiber 1 is attenuated by approximately 20%.

Because the inventive device can be manufactured with fewer technical problems with a larger diameter core, it is expedient to employ thick core fibers with a core diameter of about 200 μm or more.

Figure 3:
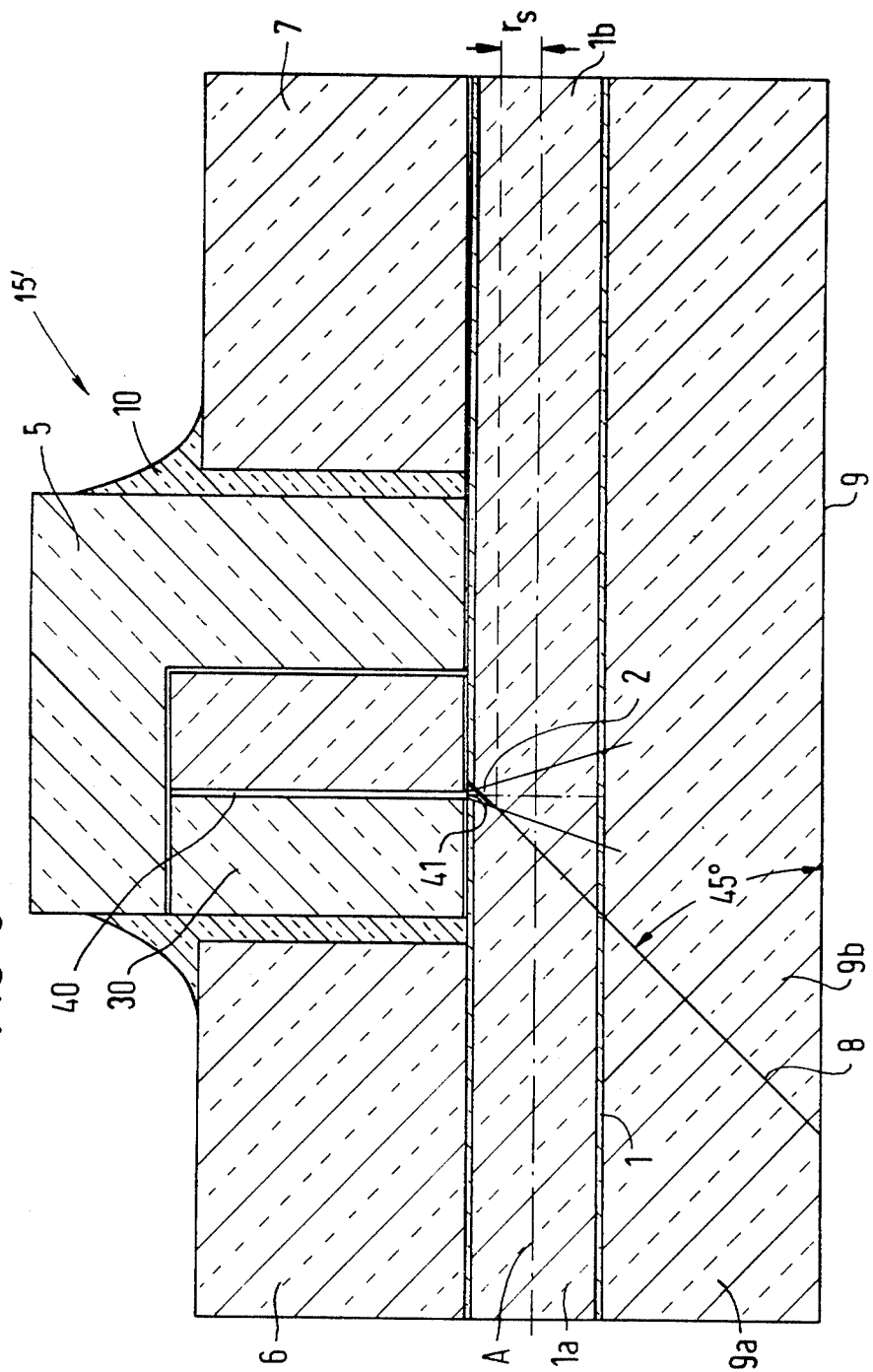
FIG. 3 is a longitudinal cross-sectional view of an embodiment of the device utilized as a bi-port.
Figure 4:
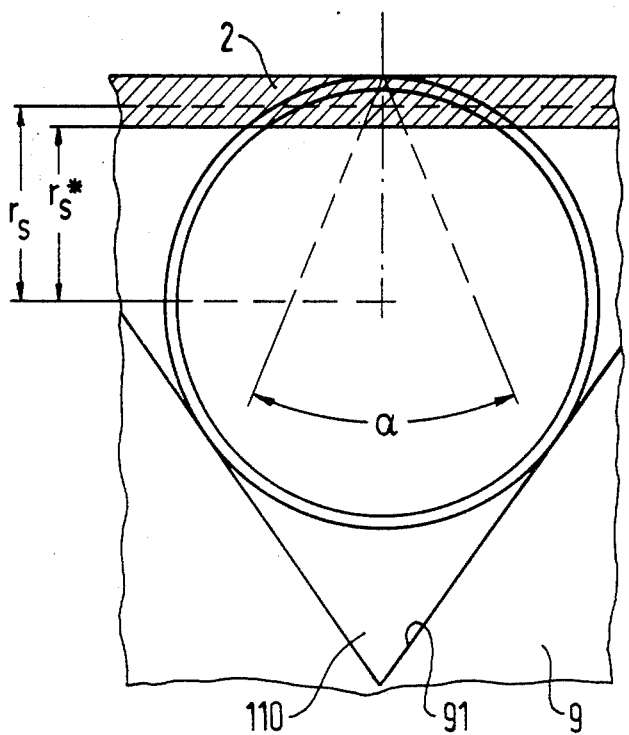
FIG. 4 is a view of an exposed plane of the waveguide section to which the reflective layer is applied with portions of the waveguide being omitted for purposes of illustration.

A particularly interesting variation of the embodiment 15 with three fiber ports, which was just described, is another embodiment which is generally indicated at 15' in FIGS. 3 and 4 and has a radiation source for example a laser diode 30 being arranged on the thick core fiber 1 instead of the glass fiber 3. As illustrated in FIG. 3, the embodiment 15' has a thick core fiber 1 which is supported in a carrier body 9. A laser diode 30, which has an active zone 40, is arranged above the reflective layer 2. The rectangular emission surface 41 of the active zone 40 of the diode 30 is equated with the radiation exit window and faces the reflective layer 2. The longitudinal axis of the emission surface 41 extends perpendicular to the axis A of the thick core fiber 1.

As best illustrated in FIG. 4, the reflective layer 2 in the embodiment 15' consists of a narrow strip which covers one segment of the cross-section of the thick core fiber 1.

A small emission surface 41 of the laser diode 30 typically has dimensions of 0.2 μm time 0.4 μm. An aperture angle of the emission perpendicular to the longitudinal direction of the emission surface will be approximately 30° through 60° as measured in air and the angle parallel to the longitudinal axis amounts to approximately 20° to 40° as measured in air. Thus, the laser diode is particularly suitable as a radiation source.

Optimum dimensions and optimum shapes for the reflective layer 2 at which the greatest possible input efficiency is achieved with the smallest attenuation of the radiation being guided in the core of the waveguide can be found from the radiation pattern of the radiation source 30, the distance of the radiation exit window 41 from the thick core fiber 1 or respectively from the reflective layer 2 as well as the shape and size of the radiation exit window 41.

A strip-shaped reflective layer as illustrated in FIG. 4 proves particularly favorable for the example of a thick core fiber 1 mentioned earlier and for the values of the laser diode which have been cited hereinabove. Given an interval S of the radiation exit window 41 from the surface of the thick core fiber 1, which interval is produced by the optical adhesive and is about 10 μm, there ensues a favorable radial interval $r_s$ of the strip 2 from the axis A of the thick core fiber 1. This interval $r_s$ can be determined from the equation:

$$r_s = \frac{r_M - r_K \cot \alpha/2 + S}{1 - \cot \alpha/2}$$

wherein $r_M$ is the overall radius; $r_K$ is the core radius of the thick core fiber; and $\alpha$ is the greater of the two angles which are selected from either the acceptance angle of the thick core fiber or the maximum aperture angle of the radiation pattern measured perpendicular to the longitudinal direction of the window 41. When the index or refraction for the core glass is 1.63 and is 1.58 for the sheath glass, the acceptance angle amounts to 28° whereas the maximum aperture angle amounts to 33° and is greater. In this case, the calculation is to be carried out with the acceptance angle. Given the values cited, the interval $r_s$ derives at $r_s \approx 105$ μm. The theoretical efficiency $\eta$ is calculated therefrom at $\eta = 99.4\%$, wherein $\eta$ is the ratio of the cross-sectional surface of the core 11 not covered by the reflective layer to its overall cross-sectional surface.

This result means that the radiation guided in the thick core fiber 1 is practically not scattered although the radiation of the laser diode is coupled in via the reflective layer 2 with the efficiency of a standard end face coupling without a lens.

Practically one can count on insertion losses of approximately 0.5 dB for the transmission in the thick core fiber. The insertion losses will occur due to alignment imprecisions, for example, axial offset in the assembly. Therefore the manufacturing tolerances can be relaxed and the distance of the strip 2 from the axis A can be reduced to $r_s^*$. In the above mentioned example, $r_s^* = 85$ μm can be selected which corresponds to an alignment tolerance of 20 μm. With this value $\eta = 94\%$ so that the transmission losses in the thick core fiber remain below 0.7 dB.

When the radiation pattern of the radiation sources are unfavorable, optical lenses can be employed for an improvement. The optical lenses are then arranged between the radiation source and the thick core fiber.

A multiple layer system which is described in *Siemens Forschungs-und Entwicklungsbericht*, 1979, pages 136-140 is advantageously suited as a reflective layer of high reflectance. Dimensioning regulation for such a multiple layer system are also cited in this publication. For example about fifteen layers are to be applied for a required reflectance of 90% and for unpolarized radiation.

The inventive device is expediently manufactured in the following manner. A thick core fiber 1 or another light waveguide which is to be employed is first bonded into a guidance groove 91 (FIG. 4) of a carrier body 9 (see FIGS. 3 and 4) with an optical low-loss adhesive 110. After the hardening of the adhesive 110, the carrier body with attached fiber 1 is divided into two parts by means of a cut which is guided at an angle of 45° to the axis A of the fiber 1 and forms separation surfaces 8 which are then polished. While using suitable contact masks on the polished surface, the reflective layer 2 is vapor deposited as either a single metallic layer or a plurality of dielectric layers on the polished separation surface 8. Both parts, such as the body part 9a with the attached waveguide part 1a and the body part 9b with the attached waveguide part 1b are then glued together in axial alignment. Either the additional or second fiber 3 or the radiation source 30 is then glued on in such a manner that its axis strikes the center of the reflective layer 2 in the core area and forms an angle of 90° with the axis A of the thick core fiber 1.

Another covering layers 6 and 7 are usually applied and the diode is provided with a diode support 5. If a second fiber is used, it is also usually provided with a support for example a capillary that receives the fiber.

Figure 5:
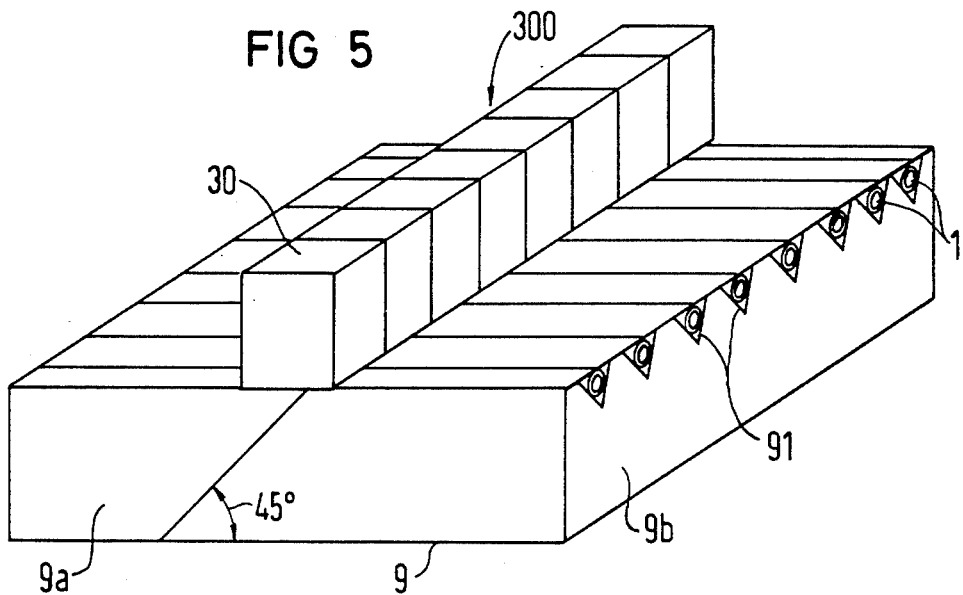
FIG. 5 is a perspective view of a coupling-in block in accordance with the present invention.

Instead of a single thick fiber 1 and one guidance groove 91, the block 9 can be provided with a plurality of parallel extending grooves 91 with each groove receiving a single thick core fiber 1 (see FIG. 5). This arrangement will produce a coupling-in block. Instead of having a single diode 30, the block has a diode line 300 applied in a position so that each diode of the line is aligned with its respective waveguide 1 and reflective layer. A plurality of glass fibers 3 could also be secured on the block in place of the diode line 300.

Although various minor modifications may be suggested by those versed in the art, it should be understood that I wish to embody within the scope of the patent granted hereon, all such modifications as reasonably and properly come within the scope of my contribution to the art.

I claim:

1. An optical device for laterally input coupling radiation into a light waveguide from a member having a radiation transmitting zone, said device comprising said waveguide having a radiation conducting core of a predetermined cross-sectional area and being formed by a pair of coaxially aligned optical fiber parts, each part having a single end face obliquely extending in a plane at an angle to the axis of the waveguide and parallel to the end face of the other part, a reflective layer of a high reflectance occupying only a small portion of the total cross-sectional area of the core, said layer being disposed between said end faces and having opposite surfaces being engaged by the end faces to hold the layer on said angle as the remaining portions of the end faces abut each other to form said waveguide, a member having a radiation transmitting zone and means for arranging said member with the radiation transmitting zone being aligned with the reflective layer so that radiation from the member is coupled in.o the waveguide by being reflected by said layer.

2. An optical device according to claim 1 wherein said reflective layer acts as a radiation exit window for radiation from the radiation transmitting zone of said member.

3. An optical device according to claim 1, wherein the reflective layer is disposed on a plane extending at 45° to the axis of the waveguide, said member having a light transmitting zone being a second waveguide having a core with a diameter smaller than the diameter of the core of the first mentioned waveguide, said means for arranging mounts the second waveguide on the first waveguide to extend at 45° to the reflective layer with the core forming a radiation window for projecting radiation at said layer for coupling into said first mentioned waveguide.

4. An optical device according to claim 3, wherein the second waveguide exhibits a numerical aperture which is almost equal to the numerical aperture of the first waveguide.

5. An optical device according to claim 1, wherein the member having a radiation transmitting zone comprises an active radiation source having a radiation exit window aligned with said reflective layer for coupling radiation directly into the waveguide.

6. An optical device according to claim 5, wherein the active radiation source is a semi-conductor laser and means for arranging mounts said radiation source directly on the waveguide.

7. An optical device according to claim 6, wherein the means for arranging mounts said radiation source with the axis of this emitted radiation extending at right angles to the axis of the waveguide, and said reflective layer is disposed in a plane extending at 45° to both the axis of the waveguide and to an axis of the radiation source.

8. An optical device according to claim 5, wherein the active radiation source is a luminescent diode and said means for arranging mounts said radiation source directly on the waveguide.

9. An optical device according to claim 8, wherein the means for arranging mounts said radiation source with the axis of said luminescent diode extending at 90° to the axis of said waveguide and said reflective layer being disposed in a plane extending at 45° to both the axis of the waveguide and an axis of the luminescent diode.

10. An optical device according to claim 1, wherein the reflective layer is arranged in the core on the side in which radiation is coupled into the core from the member having a transmitting zone.

11. An optical device according to claim 1, wherein the member having the transmitting zone comprises an active radiation source having a radiation exit window, said active radiation source being arranged with the radiation window coupling radiation through an optical lens at said reflective layer for coupling radiation directly into said waveguide.

* * * * *